(12) United States Patent
Hermann et al.

(10) Patent No.: US 7,772,143 B2
(45) Date of Patent: Aug. 10, 2010

(54) MULTILAYER, COMPOSITE, FLEECE MATERIAL AND A METHOD FOR MANUFACTURING A MULTILAYER, COMPOSITE, FLEECE MATERIAL

(75) Inventors: Stefan Hermann, Döhlau (DE); Wolfgang Höflich, Schwarzenbach/Saale (DE)

(73) Assignee: Sandler AG, Schwarzenbach/Saale (DE)

( * ) Notice: Subject to any disclaimer, the term of this patent is extended or adjusted under 35 U.S.C. 154(b) by 238 days.

(21) Appl. No.: 11/898,504

(22) Filed: Sep. 12, 2007

(65) Prior Publication Data

US 2008/0075911 A1  Mar. 27, 2008

(30) Foreign Application Priority Data

Sep. 21, 2006 (DE) .................. 10 2006 045 069

(51) Int. Cl.
*B32B 5/06* (2006.01)
*B32B 5/26* (2006.01)

(52) U.S. Cl. .............. 442/388; 442/364; 442/381; 442/387; 442/389; 442/402; 442/403; 442/407; 442/409; 442/415; 156/148

(58) Field of Classification Search ............. 442/364, 442/381, 387, 388, 389, 402, 403, 407, 409, 442/415; 156/148
See application file for complete search history.

(56) References Cited

U.S. PATENT DOCUMENTS 6,133,171 A  10/2000  Potzler et al.

FOREIGN PATENT DOCUMENTS

| DE | 90 10 276.2 U1 | 11/1990 |
| DE | 42 05 464 C1 | 3/1993 |
| DE | 42 40 516 A1 | 3/1994 |

(Continued)

OTHER PUBLICATIONS

German Office Action, dated Jul. 10, 2007, issued for counterpart German Application No. 10 2004 045 069.8 (w/English-language Translation).

(Continued)

*Primary Examiner*—Andrew T Piziali
(74) *Attorney, Agent, or Firm*—Venable LLP; Robert Kinberg; Todd R. Farnsworth

(57) ABSTRACT

The invention relates to a multilayer, composite, fleece material having a core layer and at least one cover layer attached to the core layer, where the at least one cover layer is needled with the core layer such that fibers of the at least one cover layer protrude into the core layer. The multilayer, composite, fleece material is intended for use in the manufacture of interior panels of vehicles and to have improved mechanical properties, low thermal conductivity, very low tendency to produce emissions, and good acoustic properties when used for that purpose, as well as enable its inexpensive manufacture. The cover layer and the fibers protruding from the cover layer into the core layer are at least partially firmly bonded to the core layer, where the core layer contains amorphous, bicomponent fibers having a component with a lower melting point and a component with a higher melting point, and the at least one cover layer contains crystalline, bicomponent fibers having a component with a lower melting point and a component with a higher melting point. The invention also relates to a method for manufacturing a multilayer, composite, fleece material and a method for manufacturing a molded component, for example, an automobile headlining, from the composite, fleece material.

26 Claims, 2 Drawing Sheets

FOREIGN PATENT DOCUMENTS

| | | |
|---|---|---|
| DE | 4339709 A1 | 5/1995 |
| DE | 44 00 894 A1 | 7/1995 |
| DE | 44 07 097 A1 | 9/1995 |
| DE | 195 18 285 A1 | 11/1996 |
| DE | 694 14 549 T2 | 6/1999 |
| DE | 198 12 925 A1 | 9/1999 |
| DE | 100 07 556 A1 | 2/2001 |
| DE | 697 17 662 T2 | 8/2003 |
| DE | 103 19 967 A1 | 11/2004 |
| DE | 102 97 710 T5 | 3/2006 |
| WO | WO 92/05949 | 4/1992 |
| WO | WO-92/05949 A1 | 4/1992 |

OTHER PUBLICATIONS

German-language communication from the European Patent Office, mailed Jul. 17, 2009, issued for counterpart European Patent Application No. EP1903135.

MULTILAYER, COMPOSITE, FLEECE MATERIAL AND A METHOD FOR MANUFACTURING A MULTILAYER, COMPOSITE, FLEECE MATERIAL

CROSS-REFERENCE TO RELATED APPLICATION

This application claims the priority of German Patent Application No: 10 2006 045 069.8, filed on Sep. 21, 2006, the subject matter of which is incorporated herein by reference.

BACKGROUND OF THE INVENTION

The invention relates to a multilayer, composite, fleece material having a core layer and at least one cover layer attached to the core layer, where the at least one cover layer is needled with the core layer such that fibers of the at least one cover layer protrude into the core layer.

Such composite materials may be used in the manufacture of the interior panels of vehicles, for example, automobile headlinings, where the basic structure of the composite material might look like the following: A ply or cover layer made from organosynthetic fibers, natural fibers, or glass fibers is arranged on that side of the composite material facing the vehicle's roof. An adhesive foil or powdered adhesive that binds the cover layer to a reinforcing layer is applied to this cover layer. The reinforcing layer might, for example, consist of foam, organosynthetic fibers, natural fibers, or glass fibers. An adhesive foil or powdered adhesive, with which a second cover layer is bonded to the reinforcing layer, is applied to the opposite side of the reinforcing layer, i.e., this side thereof facing the vehicles interior. The second cover layer may also consist of organosynthetic fibers, natural fibers, or glass fibers, and is usually covered with a decorative layer.

Other composite materials used for manufacturing automobile headlinings have already been described in conjunction with the state of the art. For example, a composite material for manufacturing the headlinings of vehicle roofs that consists of three, superimposed layers is known from German Patent DE 697 17 662 T2. All three layers consist of short, hot-melting, polyester fibers having a low melting point, where the intermediate layer is much thicker than the outer layers and contains polyester fibers having a lower melting point. The intermediate layer and outer layers are bonded together using a preheating process, under which the polyester fibers melt. A decorative layer may be applied to the laminated layers.

Another composite, fibrous-fleece component is known from German Patent DE 103 19 967 A1. The composite, fibrous-fleece component consists of a mixed-fiber fleece that contains higher-melting-point, thermoplastic fibers and reinforcing fibers. The mixed-fiber fleece may, preferably, be strengthened by needling. A composite foil that is composed of a layer of a higher-melting-point, thermoplastic plastic and a layer of a lower-melting-point, thermoplastic plastic is provided on one, or both, sides of the mixed-fiber fleece, where the layer of lower-melting-point, thermoplastic plastic faces the mixed-fiber fleece. The mixed-fiber fleece and composite foil are heated by a heat source to a temperature above the melting points of the thermoplastic fibers of the mixed-fiber fleece and the lower-melting-point, thermoplastic plastic of the composite foil such that they adhere to one another in order to bond them together.

German Patent DE 102 97 710 T5 also describes a fiber-reinforced, composite material and a method for manufacturing such a composite material. The composite material comprises a composite mat that has thermoplastic fibers and reinforcing fibers that are needled together. The composite mat is heated in order to melt the thermoplastic fibers and compressed, yielding a composite foil. The composite foil is reheated following compression, which yields a pseudo-foamed, composite foil due to the inherent elasticity of the reinforcing fibers.

Manufacturing molded components, such as headlinings or other components of vehicle interiors, from a needled fleece is also known from German Patent DE 100 07 556 A1, where the needling of the fleece is such that 50% of the needlings penetrate at least 60% of the thickness of the fleece, without penetrating all the way through it.

However, these composite materials which are known from the state of the art have a number of disadvantages. Mixtures of materials that are bonded together using adhesives and might also contain glass fibers for reinforcement are usually difficult to recycle, or cannot be recycled. Emission of pollutants into vehicle interiors may also occur, depending upon the raw materials employed. Furthermore, it might be observed that sagging due to thermal expansion occurs. Poor acoustic properties may be observed if duroplastic materials are employed. Those problems may be alleviated by employing needled, fleece materials, although they usually exhibit very low rigidities.

SUMMARY

The problem addressed by the present invention thus provides a composite, fleece material that is inherently stiff following the pressing process, has a unified, polymeric structure, and is thus suitable for use as cladding in the interiors of vehicles. Employment of duroplastic materials and glass should be avoided in order to achieve at acoustic properties that will be adequate for sound deadening. The material should also be thermally insulating. Emissions into vehicle interiors in the form of fogging or odors should be avoided. The composite, fleece material should have good mechanical stability, stiffness, tensile strength, and impact resistance and be inexpensive to manufacture. The material should also be readily processable, e.g., be capable of being readily formed in molds, when manufacturing interior cladding.

In that conjunction, the invention provides that the cover layer and the fibers protruding from the cover layer are at least partially firmly bonded to the core layer, where the core layer contains amorphous, bicomponent fibers having a lower-melting-point component and a higher-melting-point component, and the at least one cover layer contains crystalline, bicomponent fibers having a higher-melting-point component.

This multilayer, composite, fleece material is characterized by good bonding of the core layer to the at least one cover layer, since bonding of the core layer to the at least one cover layer extends to the fibers protruding into the core layer and the core layer, rather than being confined to the interface of the core layer and cover layer, which yields a three-dimensional bonding of the core layer and cover layer, both along the bonded interface of the core layer and cover layer and transverse to that interface. Since fiber bundles protrude from the cover layer, into the core layer, a shearing-resistant bond may be achieved. The multilayer, composite, fleece material is thus capable of accommodating both tensile and compressive loads.

The bicomponent fibers contained in the core layer and at least one cover layer may be bicomponent fibers having a core-sheath structure, where their higher-melting-point component is arranged in the core of the bicomponent fibers and is enveloped by their lower-melting-point component. However, employing side-by-side, bicomponent fibers would also be feasible, in which case, their higher-melting-point component and lower-melting-point component would we arranged next to one another.

The employment of differently structured, bicomponent fibers, i.e., amorphous and crystalline, bicomponent fibers, allows attaining a composite material having the desired properties. The crystalline, bicomponent fibers provide that the composite, fleece material will have the desired stability, while its elastic, or damping, properties are provided by the amorphous, bicomponent fibers. Since the crystalline, bicomponent fibers are contained in the at least one cover layer, the composite, fleece material is characterized by a harder, outer sheath having a softer core of amorphous, bicomponent fibers. Since crystalline fibers protrude into the core layer, a stiffening of the softer, core layer is also achieved.

A preferred embodiment of the invention provides that at least one cover layer is arranged on either side of the core layer, which allows arriving at a stable, sandwich, composite that has at least one, stable, cover layer composed of crystalline, bicomponent fibers arranged on either side of its soft, core layer composed of amorphous, bicomponent fibers. The composite, fleece material's shearing resistance is further improved, since fibers protruding from the cover layers penetrate both sides of the core layer.

In a particularly preferred embodiment, it may be provided that both the firm bonding of the core layer to the at least one cover layer and the fibers protruding from the at least one cover layer arise from a heat-treatment process. The layers that have been needled together are heated to a temperature high enough to melt both the lower-melting-point component of the amorphous, bicomponent fibers and the higher-melting-point fibers of the crystalline, bicomponent fibers. The cores of the amorphous and crystalline, bicomponent fibers remain stable at that temperature. The melted sheaths of the bicomponent fibers then bond to neighboring fibers such that a lattice-like structuring of the composite, fleece material arises.

It is particularly preferable if the lower-melting-point components of the bicomponent fibers at least partially envelop neighboring fibers of the core layer and/or the at least one cover layer. The lower-melting-point components of the bicomponent fibers melted by the heat-treatment process wrap around their neighboring fibers such that firm bonds are formed, without need for employing additional components, such adhesives. Since the higher-melting-point components of the bicomponent fibers remain in the solid phase, the network structure of the fleece is retained.

Under a variation thereon, it may be provided that the thickness of the core layer exceeds the thickness of the at least one cover layer, which will improve the desired, sound-dampening properties of the fleece material and fix the desired thickness of the fleece material.

It may also be provided that the weight per unit area of the core layer exceeds the weight per unit area of the at least one cover layer. The desired thickness of the composite material may be achieved by varying their weights per unit area.

Employing a core layer whose weight per unit volume is less than the weight per unit volume of the at least one cover layer has proven particularly beneficial. The core layer will then be less dense than the cover layer and have the desired damping properties. The more-dense cover layer lends the composite, fleece material greater mechanical stability.

Under a preferred embodiment of the invention, the weight per unit area of the core layer is about 600 g/m². It has been found that the core layer has good damping properties and adequate stability for that weight per unit area.

A particularly preferred embodiment provides that the weight per unit area of the at least one cover layer is about 200 g/m². The desired cover-layer thickness and cover-layer stability of the at least one cover layer are highly compatible for that weight per unit area.

Yet another option involves providing that the core layer and/or the at least one cover layer contain PET-matrix fibers. PET-matrix fibers have a good thermal stability and thus will not melt during heat treatment. During heat treatment, the melted, lower-melting-point component of the bicomponent fibers will thus also envelop the PET-matrix fibers, yielding a porous bond and no dense sheet. Since the bicomponent fibers preferably also consist of PET/PET-copolymer, a uniform, polymeric structure that allows easier disposal, or easier recycling, is achieved. Employment of PET-fibers also allows inexpensive manufacture of the composite, fleece material.

A variation thereon provides that the core layer contains about 50% amorphous, bicomponent fibers and about 50% PET-matrix fibers. Since the core layer contains fewer bicomponent fibers, fewer firm bonds arise during heat treatment. The core layer thus has a rather loose bonding that makes its softer and gives it good damping and buffering properties.

Yet another expedient embodiment provides that the at least one cover layer contains about 70% crystalline, bicomponent fibers and about 30% PET-matrix fibers. The percentage of bicomponent fibers in the cover layer is thus relatively high, which yields a denser bonding in the cover layer, which, in turn, yields greater strength and greater stability.

It will be expedient if the melting point of the lower-melting point component of the amorphous, bicomponent fibers of the core layer is about 110° C. The melting point will then exceed the maximum temperature of about 95° C. that can be expected to occur in vehicles. The core layer will remain rigid and not deform, even if that maximum temperature is reached. That will also allow cutting manufacturing costs, since amorphous, bicomponent fibers are less expensive than crystalline, bicomponent fibers.

The melting point of the lower-melting-point component of the crystalline, bicomponent fibers of the cover layer is preferably about 165° C. The melting point of the lower-melting-point components of the crystalline, bicomponent fibers is thus much greater than the maximum temperature of 95° C. that can be expected to occur in automobile interiors. Deformation of the cover layers can therefore be precluded, even if that maximum temperature is reached. The cover layers will thus add stability to the core layer and prevent heat conduction through automobile headlinings, even at maximum temperatures.

It will be expedient if the linear density of the amorphous, bicomponent fibers is about 4.4 dtex. The amorphous, bicomponent fibers will thus be rather fine, and therefore permit a core layer having a low weight per unit volume.

The linear density of the crystalline, bicomponent fibers may be about 7.0 dtex. The crystalline, bicomponent fibers will thus be coarser and therefore contribute to making the cover layer more stable.

An expedient embodiment provides that the insertion density of the needled, composite, fleece material ranges from 80 insertions/cm² to 130 insertions/cm² per side. Trials have shown that those values of insertion density allow manufacturing particularly suitable, stable, composite, fleece materials.

A variation thereon provides that the core layer consists of a preneedled, fleece material. The core layer thus has an inherent stability and inherent stiffness prior to its being bonded to the cover layer(s).

In that case, the insertion density of the preneedled, core layer preferably ranges from 50 insertions/cm² to 120 insertions/cm², where 85 insertions/cm² is to be particularly preferred. Trials have shown that those settings allow manufacturing particularly suitable fleece materials. If the fleece is simultaneously needled from both sides, i.e., from above and below, the preferred insertion density per side will be about 43 insertions/cm².

The invention also relates to a method for manufacturing a composite, fleece material described above that comprises the following steps: providing a core layer that, at least partly, contains amorphous, bicomponent fibers having a lower-melting-point component and a higher-melting-point component, applying a cover layer that, at least partly, contains crystalline, bicomponent fibers having a lower-melting-point component and a higher-melting-point component to at least one side of the core layer, needling the at least one cover layer onto the core layer, heating the needled layers to a temperature exceeding the melting points of the lower-melting-point components of the bicomponent fibers, and cooling the composite, fleece material.

That method allows simply manufacturing composite, fleece materials used in vehicle interiors as, for example, automobile headlinings. During heating of the needled layers, the lower-melting-point components of the bicomponent fibers melt and bond to neighboring fibers, which allows achieving good bonding of the fibers to one another, without need for adding adhesives. Since the higher-melting-point components of the bicomponent fibers remain in the solid phase, the network structure of the fleece material is retained. Eliminating use of adhesives allows guaranteeing that the fleece material will produce virtually no emissions in the form of, for example, odors or fogging. The bonding of amorphous, bicomponent fibers and crystalline, bicomponent fibers yields a good mechanical strength of the composite, fleece material that guarantees that it will have a high stiffness, low thermal conductivity, and, nevertheless, good acoustic properties.

The layers that have been needled together are preferably heated to a temperature of about 185° C. during manufacture of the composite, fleece material. That temperature exceeds the melting point of the lower-melting-point component of the crystalline, bicomponent fibers, which provides that the lower-melting-point component of the crystalline, bicomponent fibers will also melt during heat treatment, and that thereby intimate bonding between the core layer and the at least one cover layer will be achieved.

A variation thereon provides that at least one cover layer is applied to either side of the core layer, which yields a sandwich structure of the composite, fleece material having improved mechanical properties.

Another preferred embodiment provides that the core layer is needled prior to lamination of the composite, fleece material, which allows achieving a good bonding thereof, and thus a high stiffness of the core material.

It may also be provided that the at least one cover layer and the core layer are pressed following heating. The partially melted, bicomponent fibers will then come into close contact with neighboring fibers in order that a good bonding between the core layer and the at least one cover layer will be achieved.

It may also be provided that the composite, fleece material is calendered following heating, which will allow achieving smooth, visually attractive surfaces on the composite, fleece material.

The invention also relates to a method for manufacturing a molded component from the composite, fleece material described above. The method is characterized by the following steps: heating the composite, fleece material to about 200° C., inserting the heated, composite, fleece material into a thermostatted mold, and molding the composite, fleece material.

For example, an automobile headlining may be manufactured from the composite, fleece material in that manner. The composite, fleece material fits the contours of the mold well, even at locations thereon that have short radii. Due to the sandwich structure of the composite, fleece material, the automobile headlining will have the desired properties, such as good mechanical stability, good acoustic effectiveness, and good dimensional stability, even under thermal loading.

BRIEF DESCRIPTION OF THE DRAWINGS

Embodiments of the invention will be described in detail below. The figures depict.

DETAILED DESCRIPTION

Figure 1:
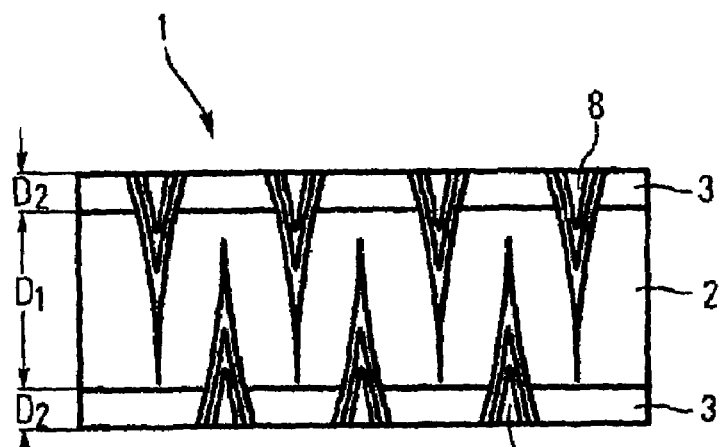
FIG. 1 a sectioned view of the composite, fleece material.

FIG. 1 depicts a sectioned view of a composite, fleece material 1. The composite, fleece material 1 has a core layer 2 and two cover layers 3. However, only one cover layer may be provided, or several cover layers may be provided on either side of the core layer 2. The thickness, $D_1$, of the core layer 2 exceeds the thickness, $D_2$, of a cover layer 3. The composite, fleece material 1 preferably has a thickness of about 7 mm and a weight per unit area of about 700 g/m² to 1,000 g/m², where 1,000 g/m² is particularly preferred.

The core layer 2 and cover layers 3 are needled together such that fibers 8 protrude from the cover layers 3, into the core layer 2, or are incorporated into the core layer 2. Needling takes place from both sides of the composite, fleece material 1, where the insertion density per side ranges from 80 insertions/cm² to 130 insertions/cm². Needles with notches or barbed hooks are employed for the needling, where the number of joints per unit area and the penetration depth may be influenced by altering settings on the needling machine. For a constant transport rate, the number of joints per unit area, i.e., the insertion density, may be varied by adjusting needle cycling rate. The penetration depth of the fibers 8 into the core layer 2 may be varied by adjusting the insertion depth. The number of fibers per insertion, or the dimensions of fiber bundles, is affected by the properties of the needles employed, such as the number of notches present on them, the shapes of their notches, etc. It has been found that the following needle types supplied by the firm of Groz Beckert, or combinations thereof, are suitable for needling the composite, fleece material 1: 15×18×38×3 R 333 G 2007, 15×18×38×3 C 222 G 3027, 15×18×36×3 C 333 G 3017.

The core layer 2 preferably consists of a preneedled, fleece material. The insertion density of the preneedled, fleece material preferably ranges from 50 insertions/cm² to 120 insertions/cm², where an insertion density of 85 insertions/cm² is particularly preferred. Since the preneedling will usually be evenly divided between needling from above and below, the insertion density per side will be about 43 insertions/cm². For example, needles supplied by the firm of Groz Beckert bearing the designation 15×18×38×3 C 222 G 3027 may be employed for that purpose. The core layer 2 has a weight per unit area of about 600 g/cm² and a weight per unit volume of about 100 kg/m³.

The employment of special needles having just a single notch allows manufacturing thicker core layers, in which case, the insertion density for the core layer will be about 100 insertions/cm² to 150 insertions/cm², where 135 insertions/cm² is particularly preferred. Needles supplied by the firm of Groz Beckert bearing the designation 15×17×36×3,5 C 001 G 53017 are suitable for such use.

Figure 2:
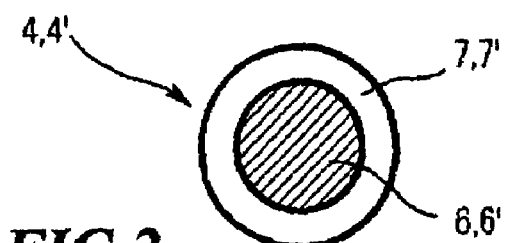
FIG. 2 a sectioned view of a bicomponent fiber of the core-sheath type.

In the case of the preferred, sample embodiment, the core layer 2 contains about 50% PET-matrix fibers 5 and about 50% PET/PET-copolymer, bicomponent fibers 4. The linear density of the PET-matrix fibers 5 is about 6.7 dtex and the linear density of the bicomponent fibers is about 4.4 dtex. The matrix fibers 5 are thus much coarser than the bicomponent fibers 4. The bicomponent fibers 4 employed are preferably bicomponent fibers of the core-sheath type. FIG. 2 depicts a sectional view of such bicomponent fibers 4. The bicomponent fibers 4 comprise a core 5 composed of a higher-melting-point component surrounded by a sheath 7 composed of a lower-melting-point component. The bicomponent fibers 4 contained in the core layer 2 are preferably amorphous, bicomponent fibers. The melting point of the sheath 7 of the amorphous, bicomponent fibers 4 is about 110° C. and the melting point of the core 6 of the amorphous, bicomponent fibers 4 is about 255° C.

The cover layers 3 arranged on the core layer 2 are unpressed, fiber-pile, layers. Those fiber-pile layers contain about 70% bicomponent fibers 4' and about 30% PET-matrix fibers 5. The cover layers 3 have a weight per unit area of about 200 g/m². The cover layers 3 have a weight per unit volume greater than that of the core layer 2. The weight per unit volume of the cover layers is about 200 kg/m³.

The bicomponent fibers 4' contained in the cover layers 3 also consist of PET/PET-copolymers. However, crystalline, bicomponent fibers 4' are preferably employed in the cover layers 3. The material of the core 6' of those crystalline, bicomponent fibers 4' is the same as that used for the core 6 of the amorphous, bicomponent fibers 4 in order that the melting point of the core 6' of the crystalline, bicomponent fibers will also be about 255° C. The melting point of the sheath 7' of the crystalline, bicomponent fibers 4' in the cover layer 3 is about 165° C. The linear density of the crystalline, bicomponent fibers 4' in the cover layer 3 is about 7.0 dtex. The crystalline, bicomponent fibers 4' are thus coarser than the bicomponent fibers 4 employed in the core layer 2. The PET-matrix fibers 5 in the cover layers 3 correspond to the PET-matrix fibers 5 in the core layer 2. Those PET-matrix fibers 5 thus have a linear density of about 6.7 dtex.

Figure 3:
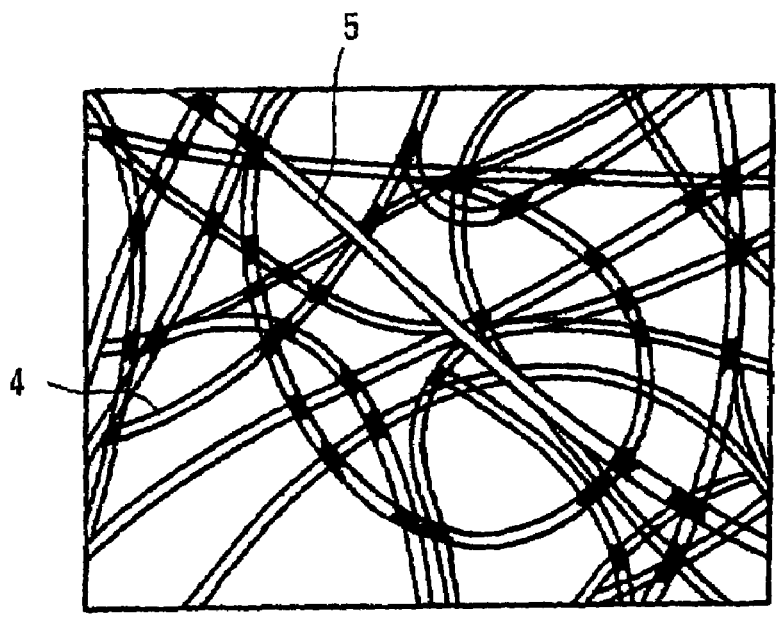
FIG. 3 a magnified view of bicomponent fibers and PET-matrix fibers that have been bonded together, and FIG. 4 a view of a system for manufacturing a composite, fleece material.

The core layer 2 and the cover layers 3 are firmly bonded to one another, which may be accomplished by, for example, heat-treating the composite, fleece material 1. Heating it to a temperature exceeding the melting points of the lower-melting-point components of the bicomponent fibers 4, 4' will melt the sheaths 7, 7' of the bicomponent fibers 4, 4' and bond them to neighboring bicomponent fibers 4, 4' or PET-matrix fibers 5. In FIG. 3, the firm bonds between bicomponent fibers 4, 4' and neighboring bicomponent fibers 4, 4' or PET-matrix fibers 5 are indicated by dark areas.

The composite, fleece material 1 thus has a sandwich structure having an inner, core layer 2 sandwiched between two cover layers 3. The core layer 2 is thicker than the cover layers 3, but has a lower weight per unit volume. The cover layers 3 are relatively thin, but have a greater weight per unit volume. Fibers 8 protrude like whiskers from the cover layers 3, into the core layer 2, and are firmly bonded thereto. Since the cover layers 3 preferably comprise crystalline, bicomponent fibers 4', those whiskers 8 are relatively stiff. The core layer 2 preferably comprises amorphous, bicomponent fibers 4 having a low linear density. The core layer 2 is thus rather soft. The fibers 8 immobilize and stiffen the core layer 2, particularly against compressive loads. The result is a shear-resistant bond between the core layer 2 and the cover layers 3.

Due to the shear-resistant bond between the core layer 2 and the cover layers 3, the composite, fleece material 1 has a high bending resistance, high tensile strength, and high impact resistance. Since the composite, fleece material 1 has a network-like structure with numerous interfaces, its acoustic effectiveness is relatively high. The composite, fleece material 1 is thus particularly suitable for use in vehicle interiors, since it allows achieving good sound deadening. Since the composite, fleece material 1 need not be bonded using added adhesives, its tendency to produce odors and fogging is reduced. The employment of crystalline, bicomponent fibers 4' having a melting point higher than that of the lower-melting-point component 7' in the cover layers 3 allows achieving a high dimensional stability of the fleece material under thermal loading.

Figure 4:
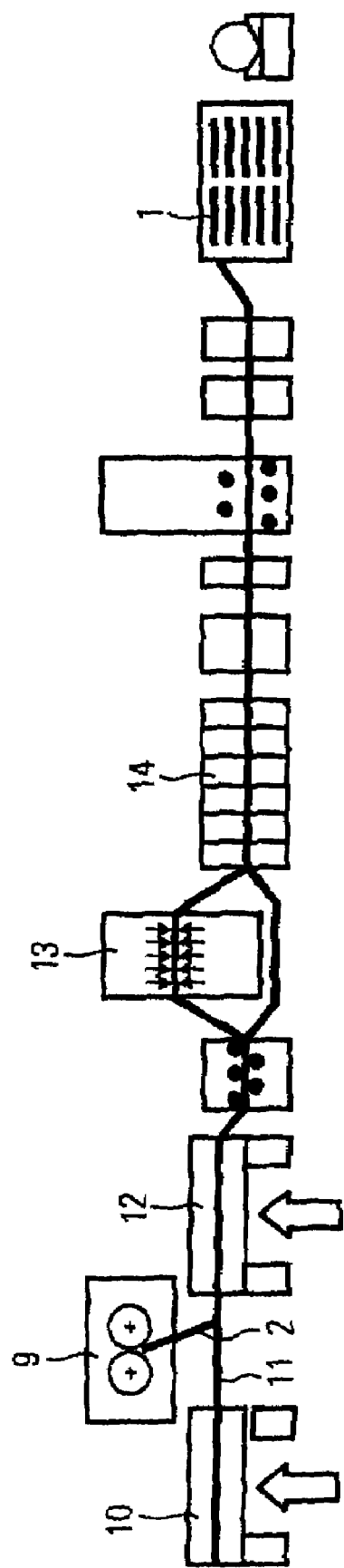

The composite, fleece material 1 may, for example, be manufactured using the system depicted in FIG. 4. The preneedled, core layer 2 is manufactured in a first step, in which amorphous, bicomponent fibers 4 and PET-matrix fibers 5 are needled on a needling machine, where the insertion density of the preneedled material ranges from 50 insertions/cm² to 120 insertions/cm², and is particularly preferably 85 insertions/cm². The insertion density may be varied by adjusting the transport rate of the fleece material and needle cycling rate. The preneedled, core-layer material has a thickness of 8 mm and a weight per unit area of about 600 g/m². However, a thicker core layer 2 might also be manufactured by using special needles and a greater insertion density of about 100 insertions/cm² to 150 insertions/cm², where 135 insertions/cm² is particularly preferred.

The needled core layer 2 is provided on an unwinding station 9. A first spreader 10 provides a first, unpressed, fiber-pile layer 11 composed of crystalline, bicomponent fibers 4' and PET-matrix fibers 5 that form the first cover layer 3. The needled, core material 2 is applied to that first cover layer 3 by the unwinding station 9. A second spreader 12 applies the second cover layer 3 to the core layer 2. That second cover layer 3 is also an unpressed, fiber-pile layer composed of crystalline, bicomponent fibers 4' and PET-matrix fibers 5. The superimposed layers are fed to a needling machine 13 and needled together such that fibers 8 are pulled out of the cover layers 3, into the core layer 2, and worked into the latter. After transiting the needling machine 13, the needled composite material transits a dryer 14, where the composite material is heated to a temperature of about 185° C., which melts both the lower-melting-point component of the amorphous, bicomponent fibers 4 of the core layer 2 and the lower-melting point component of the crystalline, bicomponent fibers 4' of the cover layers 3. The sheaths of the bicomponent fibers 4, 4' thus melt and wrap around neighboring fibers 4, 4', 5, thereby bonding the bicomponent fibers 4, 4', particularly those fibers 8 protruding from the cover layers 3 into the core layer 2 as well, to the surrounding materials. The fleece material 1 may be pressed following heating in order to guarantee good bonding of the fibers.

After transiting the dryer 14, the composite, fleece material 1 is cooled in order that the molten material will solidify. Due to the crystallinity of the bicomponent fibers 4' employed, the fibers 8 become stiff and immobilize, or stiffen, the core layer by forming a sort of lattice structure. The resultant composite, fleece material 1 is a triple-layer composite having extremely good layer adherences. The weight per unit area of the composite, fleece material is preferably 1,000 g/m$^2$, and its thickness is about 7 mm. The composite, fleece material 1 may then be smoothed on calenders. The final-pressed, cooled, fleece material 1 is cut up into sheets and stored.

The composite, fleece material 1 is heated to a temperature of 200° C. in order to manufacture interior claddings of vehicles, for example, automobile headlinings, from the composite, fleece material 1. The heated material 1 is inserted into a thermostatted mold, where the temperature of the mold is about 80° C. The composite, fleece material 1 is brought into the desired shape in the mold. Since the composite, fleece material 1 has been heated to a temperature exceeding the melting points of the lower-melting-point components 7, 7' of the amorphous, bicomponent fibers 4 and the crystalline, bicomponent fibers 4', they will be in the molten state. The fleece material 1 will thus very accurately conform to the contours of the mold, in particular, at locations thereon having short radii or fine features. The composite, fleece material 1 will solidify to the prescribed shape upon cooling.

Compressive or tensile loads exerted on a finished headlining will also be locally taken up by the molded component's inner layer, rather than spread over the surface of the molded component. The composite, fleece material will also be a close fit in molds and therefore allow precision molding and fully filling out molds. Wrinkling during deforming in the mold may also be reduced.

What is claimed is:

1. A multilayer, composite, fleece material having a core layer and at least one cover layer attached to the core layer, where the at least one cover layer is needled with the core layer such that fibers of the at least one cover layer protrude into the core layer, characterized in that the cover layer and the fibers protruding from the cover layer into the core layer are at least partially firmly bonded to the core layer, where the core layer contains amorphous sheath, bicomponent fibers having a component with a lower melting point and a component with a higher melting point, and the at least one cover layer contains crystalline sheath, bicomponent fibers having a component with a lower melting point and a component with a higher melting point.

2. A composite, fleece material according to claim 1, characterized in that at least one cover layer is arranged on either side of the core layer.

3. A composite, fleece material according to claim 1, characterized in that the firmly bonded joint between the core layer and the at least one cover layer and the fibers protruding from the at least one cover layer into the core layer originate from a heat-treatment process.

4. A composite, fleece material according to claim 1, characterized in that the lower-melting-point components of the bicomponent fibers at least partially envelop neighboring fibers of the core layer and/or the at least one cover layer.

5. A composite, fleece material according to claim 1, characterized in that the thickness of the core layer exceeds the thickness of the at least one cover layer.

6. A composite, fleece material according to claim 1, characterized in that the weight per unit area of the core layer exceeds that of the at least one cover layer.

7. A composite, fleece material according to claim 1, characterized in that the weight per unit volume of the core layer is less than that of the at least one cover layer.

8. A composite, fleece material according to claim 1, characterized in that the weight per unit area of the core layer falls within the range 500 g/m$^2$-800 g/m$^2$.

9. A composite, fleece material according to claim 1, characterized in that the weight per unit area of the at least one cover layer falls within the range 150 g/m$^2$-250 g/m$^2$.

10. A composite, fleece material according to claim 1, characterized in that the core layer and/or the at least one cover layer contain PET-matrix fibers.

11. A composite, fleece material according to claim 1, characterized in that the core layer contains about 50% amorphous sheath, bicomponent fibers and about 50% PET-matrix fibers.

12. A composite, fleece material according to claim 1, characterized in that the at least one cover layer contains about 70% crystalline sheath, bicomponent fibers and about 30% PET-matrix fibers.

13. A composite, fleece material according to claim 1, characterized in that the melting point of the lower-melting-point component of the amorphous sheath, bicomponent fibers of the core layer is approximately 110° C.

14. A composite, fleece material according to claim 1, characterized in that the melting point of the lower-melting-point component of the crystalline sheath, bicomponent fibers of the at least one cover layer is approximately 165° C.

15. A composite, fleece material according to claim 1, characterized in that the amorphous sheath, bicomponent fibers have a linear density of about 4.4 dtex.

16. A composite, fleece material according to claim 1, characterized in that the crystalline sheath, bicomponent fibers have a linear density of about 7.0 dtex.

17. A composite, fleece material according to claim 1, characterized in that the insertion density of the needled, composite, fleece material per side falls within the range 80 insertions/cm$^2$-130 insertions/cm$^2$.

18. A composite, fleece material according to claim 1, characterized in that the core layer consists of a preneedled, fleece material.

19. A composite, fleece material according to claim 18, characterized in that the insertion density of the needled core layer falls within the range of 50 insertions/cm$^2$-120 insertions/cm$^2$.

20. A method for manufacturing a multilayer, composite, fleece material according to claim 1, characterized by the following steps: providing a core layer that, at least partly, contains amorphous sheath, bicomponent fibers having a lower-melting-point component and a higher-melting-point component, applying a cover layer that, at least partly, contains crystalline sheath, bicomponent fibers having a lower-melting-point component and a higher-melting-point component to at least one side of the core layer, needling the at least one cover layer onto the core layer, heating the needled layers to a temperature exceeding the melting points of the lower-melting-point components of the bicomponent fibers, and cooling the composite, fleece material.

21. A method according to claim 20, characterized in that the needled layers are heated to a temperature of about 185° C.

22. A method according to claim 20, characterized in that at least one cover layer is applied to either side of the core layer.

23. A method according to claim 20, characterized in that the core layer is needled prior to lamination of the composite, fleece material.

24. A method according to claim 20, characterized in that the at least one cover layer and the core layer are pressed together following heating.

25. A method according to claim 20, characterized in that the composite, fleece material is calendered following heating.

26. A method for manufacturing a formed component from a composite, fleece material according to claim 1 characterized by the following steps: heating the composite, fleece material to a temperature of about 200° C., inserting the heated, composite, fleece material into a thermostated mold, and molding the composite, fleece material.

* * * * *